United States Patent Office 3,557,168
Patented Jan. 19, 1971

3,557,168
AQUEOUS ACETONE EXTRACTION
OF COTTONSEED
Walter A. Pons, Jr., New Orleans, and Paul H. Eaves,
Metairie, La., assignors to the United States of America as represented by the Secretary of Agriculture
Filed July 18, 1968, Ser. No. 745,888
Int. Cl. C11b 1/00
U.S. Cl. 260—412.4      3 Claims

ABSTRACT OF THE DISCLOSURE

This invention relates to a process for extracting cottonseed flakes. More particularly, this invention relates to a process whereby cottonseed flakes are extracted with acetone containing 25–30% water to remove all of the gossypol, most of the free fatty acids, about half of the raffinose, and negligible quantities of neutral oil and protein.

Figure 1:
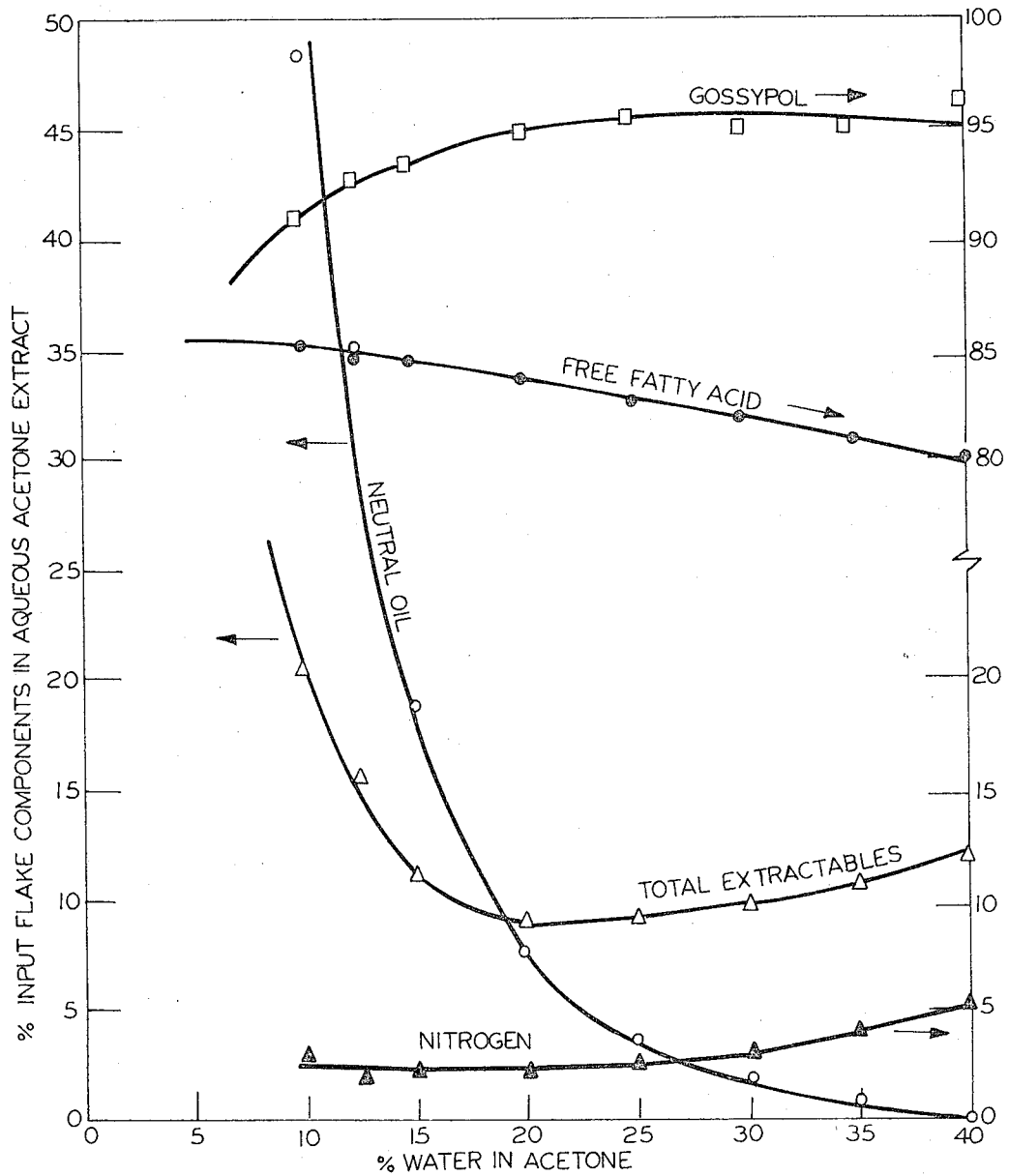

A non-exclusive, irrevocable, royalty-free license in the invention herein described, throughout the world for all purposes of the United States Government, with the power to grant sublicenses for such purposes, is hereby granted to the Government of the United States of America.

An object of this invention is to provide a method for removing essentially all of the gossypol in cottonseed flakes. A further object of this invention is to remove from cottonseed flakes all of the gossypol, most of the free fatty acids, about half of the raffinose, but only negligible quantities of neutral oil and protein.

Gossypol pigments present in cottonseed in amounts ranging from 0.4 to 1.5% of the weight of the kernel have long presented unique problems in the processing of this oil seed. These native gossypol pigments have adverse physiological effects on nonruminants and their presence in crude cottonseed oil leads to rapid color fixation reactions resulting in dark colored refined and bleached oils. In most present commercial cottonseed processes, these undesirable effects are minimized by various types of wet-cooking procedures designed to react or "bind" gossypol pigments with the protein and other meal constituents prior to oil extraction. While this serves to decrease the physiological activity of gossypol pigments, and to reduce extraction of gossypol into the oil, more recent observations have demonstrated that wet cooking of cottonseed adversely affects protein value, primarily due to the reaction of gossypol with the epsilon amino group of lysine, the limiting amino acid of cottonseed.

Worldwide interest in oilseeds as protein-rich supplements in human diets has recently focused attention on cottonseed as a potentially valuable protein supplement in areas where serious protein and chloric deficiencies exist. Although the role of gossypol in human nutrition has not been completely defined, the known physiological activity of gossypol and its derivatives suggests that protein-rich cottonseed concentrates of optimum quality should ideally contain low levels of gossypol and high levels of epsilon amino lysine.

In addition to these considerations, potential processing methods for oilseeds should also be evaluated in terms of their efficiency for removing toxic mold metabolites such as "aflatoxins" which can result from invasion of agricultural products by certain strains of common molds such as *Aspergillus flavus* during unfavorable conditions of harvesting and storage.

An ideal solution to the preparation of cottonseed meal concentrates and oils of optimum quality involves selective extraction of undesirable seed constituents such as gossypol and aflatoxins under conditions favorable to retention of maximum protein value followed by extraction of oil under equally favorable conditions. The approach presented here involves selective extraction of gossypol pigments with aqueous acetone, a solvent in which triglycerides are essentially insoluble followed by oil removal either by hexane extraction or mechanical pressing.

Prime quality cottonseed flakes were decorticated and passed through smooth rolls to prepare flakes of 0.008–0.010 inch thickness. Weighed 100 gram portions of the flakes were transferred to a jacketed extraction vessel and extracted with 400 gram quantities of acetone-water solvents in which the water content was varied from 10% to 40% by weight. In each extraction, flakes were stirred with the desired acetone-water solvent for 30 minutes at 30° C. following which the mass was transferred to a Buchner funnel and filtered under reduced pressure. The flakes were then washed with two displacement washes of the appropriate acetone-water solvent using a ratio of 2 parts of solvent to 1 part of flakes by weight for each displacement wash. The solvent damp flakes were then reintroduced into the extraction vessel and extracted with 4 parts of hexane under the same conditions as used for the aqueous acetone extraction to remove the neutral oil.

Moisture and solvent-free yields of extracted flakes, aqueous acetone extract and oil were obtained. Portions of the original input flakes, the aqueous acetone extracted flakes and the aqueous acetone-hexane extracted flakes were analyzed for moisture, total oil, neutral oil, total nitrogen, free fatty acids, free and total gossypol, and total sugars. The analyses were used to calculate the percent of the input constituents removed in the aqueous acetone extract. The data are plotted in FIG. 1. This data indicates that minimum extraction of total flake solids occurs with acetone containing 20–30% water by weight. Decreasing water content of the acetone below 20% results in extraction of the neutral oil while increasing the water content of the acetone above 20% increases the extraction of water soluble carbohydrates. Maximum extraction of gossypol in the input flakes occurred with acetone containing 25–30% water by weight. The extraction of protein was low and was relatively unaffected at all acetone-water ratios.

Figure 2:
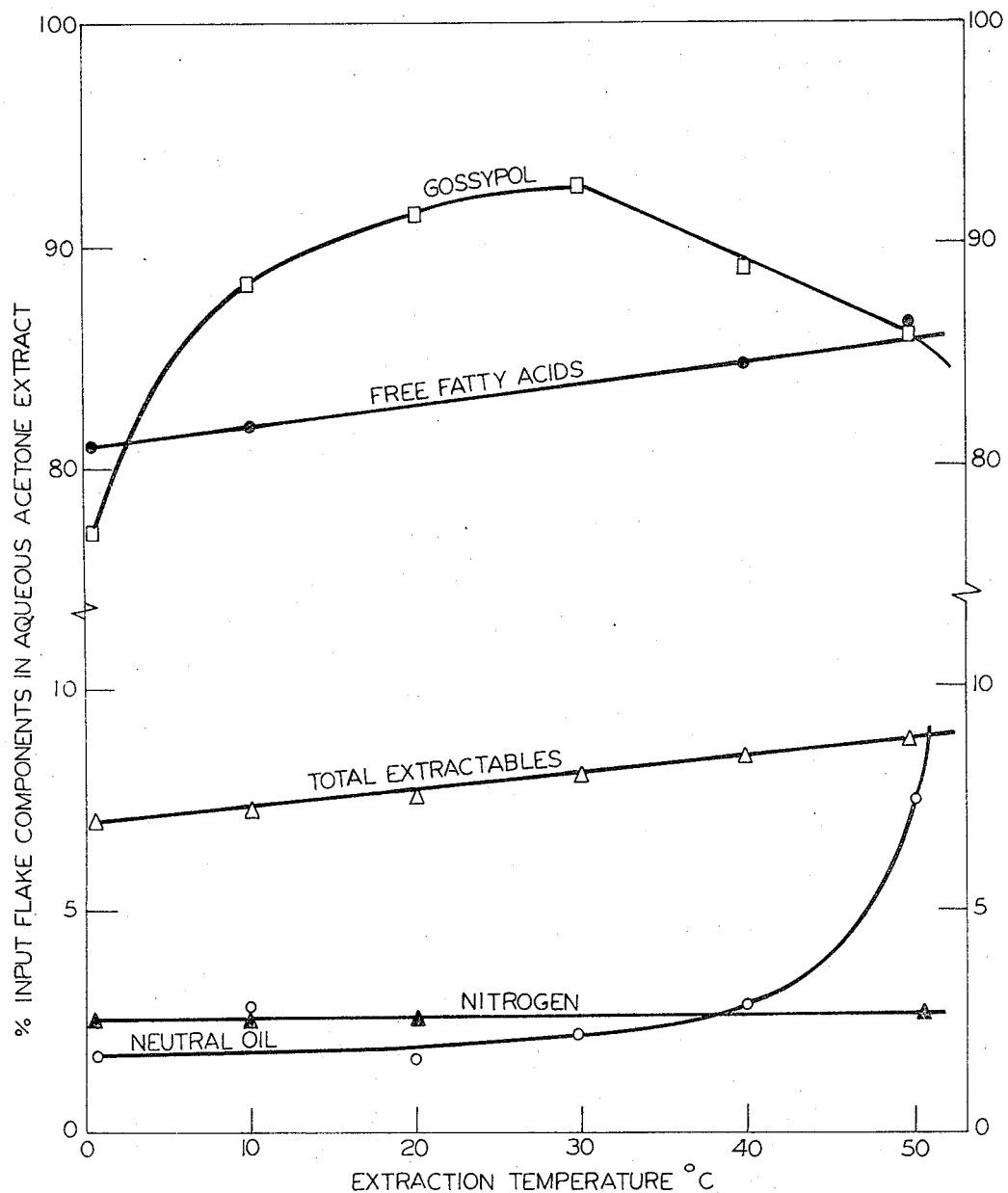

Extraction temperature was explored by extracting weighed 100 gram portions of prime quality cottonseed flakes, 0.008–0.010 inch thickness with 400 grams of an acetone-water solvent containing 30% water by weight for 30 minutes at extraction temperatures ranging from 1° C. to 50° C. The data are plotted in FIG. 2. Maximum gossypol extraction occurred at 25–30° C. Meals from low temperature extraction in the range of 1–20° C. were characterized by higher "free" gossypol content while those in the range of 35–50° C. were characterized in higher "bound" gossypol content indicating reaction of gossypol with protein.

Experiments were conducted using 100 grams of flaked meats extracted with 400 grams of aqueous acetone containing 30% water by weight at 30° C. for periods of time ranging from 10 to 60 minutes. Extraction time had little effect on any flake constituent other than gossypol, which required a 30 minute time for maximum extraction.

From these studies the optimum conditions for aqueous acetone extraction of cottonseed flakes consistent with maximum removal of undesirable constituents such as gossypol and minimum removal of protein or neutral oil are as follows:

(a) water in acetone: 25–30% by weight
(b) extraction temperature: 25–30° C.
(c) extraction time: 30 minutes
(d) solvent-flake ratio: 2:1
(e) displacement washes: 2, using a 2:1 weight ratio of solvent to flakes for each displacement wash Yield and distribution of flake components under the optimum extraction conditions are shown in Tables I and II.

TABLE I.—YIELD AND DISTRIBUTION OF FLAKE COMPONENTS FROM AQUEOUS ACETONE-HEXANE EXTRACTION UNDER OPTIMUM CONDITIONS

| Product | Product yields | Gossypol | | Input flake components | | | | |
| --- | --- | --- | --- | --- | --- | --- | --- | --- |
| | | Free | Total | Total N | Neutral oil | FFA | Total sugars | EAF lysine |
| As g. per 100 g. moist-free flakes c | | | | | | | | |
| Flakes | 100 | 1.17 | 1.22 | 6.37 | 35.8 | 0.89 | 5.16 | d 4.0 |
| Extract a | 5.9 | | 1.13 | 0.16 | 0.61 | 0.68 | 2.28 | |
| Meal | 58.7 | 0.01 | 0.08 | 6.21 | 0.31 | | 2.88 | d 4.0 |
| Oil b | 35.5 | | 0.01 | 0.002 | 34.9 | 0.22 | | |
| Percent distribution of flake components | | | | | | | | |
| In extract | | 97.3 | 2.5 | 2.0 | 76.4 | 44.2 | | |
| In meal | | 1.9 | 97.5 | 0.9 | | 55.8 | 100 | |
| In oil | | 0.8 | | 97.1 | 23.6 | | | | a Crude aqueous acetone extract.
b By hexane extraction of aqueous acetone-extracted flakes.
c Average of five experiments.
d Calc. as g. per 16 g. N.

TABLE II.—AVERAGE COMPOSITION OF PRODUCTS FROM AQUEOUS ACETONE-HEXANE EXTRACTION

| Property (aver. of 5 experiments) analyses on d.b. | Aqueous acetone extract | Meal | Crude oil |
| --- | --- | --- | --- |
| Free gossypol, percent | | 0.020 | |
| Total gossypol, percent | 19.5 | 0.090 | 0.028 |
| Total N, percent | 2.87 | 10.53 | 0.01 |
| Protein, percent | | 65.8 | |
| EAF Lysine g./16 g. N | | 4.0 | |
| Crude lipids, percent | 20.3 | 0.10 | |
| Neutral oil, percent | 10.3 | | 99.2 |
| F.F.A., percent | 11.7 | | 0.56 |
| Total sugars, percent | 38.6 | 4.91 | |

EXAMPLE 1

One lot of cottonseed with a moisture content of about 8.0% and with a high fatty acid content was mechanically decorticated, screened to remove hulls and the kernels passed through smooth rolls to provide flakes 0.008–0.010 inch thickness for extraction studies. The flakes were stirred at 70 r.p.m. in acetone containing 25–30% water at a temperature of 30° C. for 30 minutes and a solvent-flake ratio of 2:1. The mixture was decanted on a Buchner funnel and filtered under reduced pressure. The extraction reaction vessel was rinsed with two batches of displacement washes using a 2:1 weight ratio of solvent to flakes for each displacement wash with each wash being successively decanted into the marc on the filter. The marc was dried to about 12% moisture. The acetone extracted flakes were then pulverized to pass a 0.25 inch mesh screen and then passed through smooth rolls to provide uniform flakes of 0.008–0.010 inch thickness. The oil was then readily removed by hexane extraction producing meals with less than 1% residual oils.

EXAMPLE 2

One lot of cottonseed with a moisture content of about 8% and a low fatty acid content was mechanically decorticated, screened to remove hulls and the kernels passed through smooth rolls to provide flakes 0.008–0.010 inch thickness for extraction studies. The flakes were stirred at 70 r.p.m. in acetone containing 25–30% water at a temperature of 25–30° C. for 30 minutes and a solvent-flake ratio of 2:1. The mixture was decanted on a Buchner funnel and filtered under reduced pressure. The extraction reaction vessel was rinsed with two batches of displacement washes using a 2:1 weight ratio of solvent to flakes for each displacement wash with each vessel being successively decanted into the marc on the filter. The marc was dried to about 12% moisture. The acetone extracted flakes were then pulverized to pass a 0.25 inch mesh screen and then passed through smooth rolls to provide uniform flakes of 0.008–0.010 inch thickness. The oil was then readily removed by hexane extraction producing meals with less than 1% residual oils.

For comparison, a portion of the flaked cottonseed meats were also extracted with hexane only under conditions simulating commercial practice.

The analyses of the resulting products are shown in Table III. The aqueous acetone-hexane extracted meal was much lower in free and total gossypol content, residual lipids, and total sugars, and significantly higher in protein content, as compared to the direct hexane extracted meal. Both were high in epsilon free lysine.

TABLE III.—PROPERTIES OF MEALS FROM AQUEOUS ACETONE-HEXANE, AND DIRECT HEXANE EXTRACTION

| Type of extraction | Gossypol | | Nitrogen | | Lipids, percent | Total sugars, percent | EAF lysine, g./16g.N |
| --- | --- | --- | --- | --- | --- | --- | --- |
| | Free, percent | Total, percent | Free, percent | Total, percent | | | |
| Aqueous acetone-hexane | 0.05 | 0.22 | 10.83 | 67.7 | 0.9 | 3.1 | 4.0 |
| Direct hexane | 1.40 | 1.56 | 9.84 | 61.5 | 1.5 | 7.4 | 4.0 |

The crude oils from the aqueous acetone-hexane, and the direct hexane extractions were subjected to standard cup refining and bleaching tests of the American Oil Chemists' Society. The results, shown in Table IV demonstrate that the crude oil from the aqueous acetone-hexane extraction is very light in color, and contains negligible amounts of gossypol. In contrast the crude oil from direct hexane extraction is higher in gossypol content and much darker. After refining and bleaching tests, the aqueous acetone-hexane oil has a lower refined and bleached color, as compared to direct hexane extracted oil.

TABLE IV.—PROPERTIES OF AQUEOUS ACETONE-HEXANE, AND DIRECT HEXANE EXTRACTED OILS

| | Aqueous acetone-hexane | Direct hexane |
| --- | --- | --- |
| Total Gossypol, percent | 0.012 | 0.14 |
| Free fatty acids, percent | 0.50 | 1.20 |
| Crude oil color, Lovibond red | 7.5 | 33+ |
| Refining loss, percent | 7.8 | 6.0 |
| Refining oil color, Lovibond red | 4.2 | 8.4 |
| Bleached oil color, Lovibond red | 2.4 | 6.1 |

EXAMPLE 3

One lot of mold damaged cottonseed containing 535 p.p.b. (μg./kg.) of aflatoxin $B_1$ was mechanically decorticated, screened to remove hulls, and the kernals passed through smooth rolls to provide flakes 0.008–0.010 inch thickness for extraction studies. The flakes were stirred at 70 r.p.m. in acetone containing 25–30% water at a temperature of 25–30° C. for 30 minutes and a solvent flake ratio of 2:1. The mixture was decanted on a Buchner funnel and filtered under reduced pressure. The extraction reaction vessel was rinsed with two batches of displacement washes using a 2:1 weight ratio of solvent to flakes for each displacement wash with each wash being successively decanted into the marc on the filter. The marc was dried to about 12% moisture. The acetone extracted flakes were then pulverized to pass a 0.25 inch mesh screen and then passed through smooth rolls to provide uniform flakes of 0.008 to 0.010 inch thickness. The oil was then readily removed by hexane extraction producing meals with less than 1% residual oils. The mold damaged cottonseed contained 535 p.p.b. of aflatoxin $B_1$. The oil was devoid of $B_1$ and the meal had 26 p.p.b. $B_1$.

For comparative purposes a representative portion of the mold damaged flaked cottonseed were extracted with hexane in a single stage extraction under conditions simulating conventional commercial practice. The analyses of the meals from both the aqueous acetone-hexane and direct hexane extraction of mold damaged cottonseed are shown in Table V. The input flakes from the mold damaged seed were high in free fatty acids, 7.8%, low in neutral oil, 25.7%, and total sugars, 2.4%, and contained a considerable amount of bound gossypol as indicated by the difference between free and total gossypol, 0.85 and 0.98% respectively. The flakes also contained a high level of aflatoxin $B_1$, 535 parts per billion, as a result of mold damage.

The aqueous acetone-hexane extracted meal was low in free and total gossypol, high in protein and epsilon-amino free lysine, and very low in aflatoxin $B_1$, 26 parts per billion. In contrast, the direct hexane extracted meal was high in free and total gossypol, lower in protein, and contained a high level of residual aflatoxin $B_1$, 519 parts per billion.

This aqueous acetone-hexane extraction was highly effective in removing toxic mold metabolites from mold damaged cottonseed, some 97% being removed in the aqueous actone extraction, while only 3% remained in the meal. In contrast the direct hexane extraction removed only 2% of the aflatoxin $B_1$ while 98% remained in the meal. The aqueous acetone-hexane extracted crude oil was devoid of aflatoxin $B_1$ while the direct hexane extracted oil contained 24 parts per billion of aflatoxin $B_1$.

TABLE V.—COMPOSITION OF MEALS FROM EXTRACTION OF MOLD DAMAGE COTTONSEED

| Composition, moisture-free basis | Aqueous acetone-hexane | Direct hexane |
| --- | --- | --- |
| Free Gossypol, percent | 0.052 | 1.33 |
| Total Gossypol, percent | 0.24 | 1.53 |
| Protein (N×6.25), percent | 60.0 | 53.3 |
| Total Sugars, percent | 1.90 | 3.85 |
| Neutral Oil, percent | 0.40 | 0.70 |
| EAF Lysine, g./16 g. N | 4.0 | 4.0 |
| Aflatoxin $B_1$, p.p.b. | 26 | 519 |

EXAMPLE 4

One lot of mold damaged cottonseed containing 25 p.p.b. of aflatoxin $B_1$ was mechanically decorticated, screened to remove hulls, and the kernels passed through smooth rolls to provide flakes 0.008–0.010 inch thickness for extraction studies. The flakes were stirred at 70 r.p.m. in acetone containing 25–30% water at a temperature of 25–30° C. for 30 minutes and a solvent-flake ratio of 2:1. The mixture was decanted on a Buchner funnel and filtered under reduced pressure. The extraction vessel was rinsed with two batches of displacement washes using a 2:1 weight ratio of solvent to flakes for each displacement wash with each wash being successively decanted into the marc on the filter. The marc was dried to about 12% moisture. The acetone extracted flakes were then pulverized to pass a 0.25 inch mesh screen and then passed through smooth rolls to provide uniform flakes of 0.008–0.010 inch thickness. The oil was then readily removed by hexane extraction producing meals with less than 1% residual oils. The original input mold damaged cottonseed flakes contained 25 parts per billion of aflatoxin $B_1$. The aqueous acetone-hexane extracted meal was free of detectable aflatoxin $B_1$ ($<1$ p.p.b.) and the crude oil was likewise free of detectable aflatoxin $B_1$ ($<1$ p.p.b.).

EXAMPLE 5

One lot of cottonseed of low fatty acid content was mechanically decorticated, screened to remove the hulls, and the hull-free kernels passed through smooth rolls to provide flakes of 0.008–0.010 inch thickness for extraction. The flakes were stirred at 70 r.p.m. with an aqueous acetone solution containing 30% water by weight for 30 minutes at 30° C. and a solvent-flake ratio of 2:1 following which the mixture was decanted onto a filter, and filtered under reduced pressure. The filter cake was washed with two displacement washes of aqueous acetone, using a ratio of 2 parts of displacement wash to one part of cake, on a weight basis. The resultant aqueous acetone cake was dried to about 12% moisture to remove the solvent. Portions of the cake were then subjected to hydraulic pressing at 2000 p.s.i. gauge at 25° C. for 1 hour, and at 2000 p.s.i. gauge at 90–95° C. for 1 hour respectively, to remove the residual oil.

The analyses of the meals and oils from the cold and hot pressing of aqueous acetone extracted cottonseed flake are shown in Table VI.

TABLE VI.—COMPOSITION OF MEALS AND CRUDE OILS FROM AQUEOUS ACETONE-HYDRAULIC PRESSING

| | Composition, moisture free basis | | | | | | |
| --- | --- | --- | --- | --- | --- | --- | --- |
| | Gossypol | | | | | Neutral | EAF |
| Product | Free, percent | Total, percent | Protein, percent | Lipids, percent | FFA, percent | oil, percent | lysine, g./16 g. N |
| Cold press meal | 0.016 | 0.12 | 51.0 | 25.6 | | | 4.0 |
| Hot press meal | 0.013 | 0.14 | 61.4 | 10.3 | | | 3.9 |
| Cold press oil | | 0.012 | | | 0.13 | 99.4 | |
| Hot press oil | | 0.010 | | | 0.14 | 99.6 | |

Both of the pressed meals were light in color, low in gossypol content, high in protein and available lysine. The meals had a bland, slightly nut-like taste, and the crude oils were light colored, low in gossypol, and high in neutral oil. Thus aqueous acetone extraction followed by mechanical pressing offers an opportunity to produce high protein, low gossypol meals. By the choice of pressing temperature either low or high-oil meals can be produced. Such meals would have utility both for animal feeding, and in supplementing both caloric and protein requirements in human nutrition.

We claim:

1. A process for producing cottonseed meal substantially free of gossypol pigments and aflatoxin which comprises:

(a) decorticating cottonseed and screening to remove hulls;

(b) pressing the decorticated and dehulled cottonseed to provide flakes of about 0.008–0.010 inch thickness;

(c) extracting said flakes by stirring in an aqueous acetone solvent containing about 25–30% water at a temperature of about 25°–30° C. for a period of about 30 minutes, the solvent-flake ratio being about 2:1;
(d) separating the solvent from the extracted flakes and subjecting the latter to successive displacement washes, using a 2:1 weight ratio of solvent to flakes for each of said washes;
(e) drying the marc resulting from step (d) to a moisture content of about 12%;
(f) pulverizing said marc to pass a 0.25 inch screen; and
(g) pressing said pulverized marc to provide uniform flakes of about 0.008–.10 inch thickness.

2. The process of claim 1 wherein the aqueous acetone extracted flakes are subjected to hydraulic pressing at about 2000 p.s.i. gauge at a temperature of about 25° C. for a period of about one hour to give meals light in color, low in gossypol and aflatoxin content and high in available lysine and oils, light in color and high in neutral oil.

3. The process of claim 1 wherein the aqueous acetone extracted flakes are extracted with hexane to give meals light in color, low in gossypol and aflatoxin content and high in protein and available lysine and oils, low in gossypoly and aflatoxin content, light in color and refines to prime crude cottonseed oil and bleaches to prime summer yellow cottonseed oil.

References Cited
UNITED STATES PATENTS

| | | | |
|---|---|---|---|
| 2,485,916 | 10/1949 | Perez | 260—412.2 |
| 2,726,253 | 12/1955 | Gastrock et al. | 260—412.4 |

LEWIS GOTTS, Primary Examiner

J. R. BROWN, Assistant Examiner

U.S. Cl. X.R.

260—412.2